June 19, 1962 — R. H. LAPUYADE — 3,040,229

CONTROL SYSTEMS

Filed June 4, 1957 — 4 Sheets-Sheet 1

INVENTOR.
Robert Henri Lapuyade
BY Kenyon & Kenyon
ATTORNEYS

June 19, 1962 R. H. LAPUYADE 3,040,229

CONTROL SYSTEMS

Filed June 4, 1957 4 Sheets-Sheet 2

INVENTOR.
Robert Henri Lapuyade
BY Kenyon & Kenyon
ATTORNEYS

INVENTOR.
Robert Henri Lapuyade
BY Kenyon & Kenyon
ATTORNEYS

INVENTOR.
ROBERT HENRI LAPUYADE
BY Kenyon & Kenyon
ATTORNEYS 3,040,229
CONTROL SYSTEMS Robert Henri Lapuyade, Paris, France, assignor to Societe des Accumulateurs Fixes et de Traction (Societe Anonyme), Romainville, France, a company of France Filed June 4, 1957, Ser. No. 663,532
Claims priority, application France June 8, 1956
7 Claims. (Cl. 320—32)

This invention relates to amplifier systems suitable for use in voltage control and regulating devices and also current limiting devices.

In my copending application, Serial No. 545,942 filed November 9, 1955, now Patent No. 2,957,117, a voltage control device has been described comprising a voltage generator and standard of voltage derived from an electrolytic cell so adapted that it supplies at its terminals a constant and unvarying voltage even when the current which flows through it varies over a large range of intensity, means being provided to act upon the generator voltage so that it varies as a function of the difference between the cell voltage and a voltage drawn from the generator voltage with a suitable coefficient.

Objects and features of the present invention are to provide a system in which the reference or standard cell and the voltage generator are associated with an electronic amplifier e.g. an amplifier using germanium triodes (transistors) adapted in such a way that it detects and amplifies the difference between a fraction of the generator voltage and the standard cell voltage and as a result supplies a current which is used for monitoring the means provided to act upon the generator voltage.

If, for example, the current supplied by a voltage generator is obtained from a rectified alternating current, an amplifier of the electromagnetic kind or transducer, such as the one described in the said application, may be used to act upon the charging voltage. In such a case, the incorporated electronic or transistor type amplifier will be disposed so that its output current flows through the monitoring winding of the transducer.

Further objects and features of the invention are the provision of an amplifier system that can be utilized to provide a signal or control current when the intensity in a D.C. circuit first reaches and then goes beyond a predetermined value.

Further objects and features of the invention are the provision of an amplifier system utilizing interconnected transistor or crystal triodes arranged in a system of high sensitivity for voltage regulation of a source for general purposes or for example in the regulation of the charging of a storage battery.

Other objects and features of the invention will become apparent from the following specification and the accompanying drawings wherein.

Figures 1, 2:
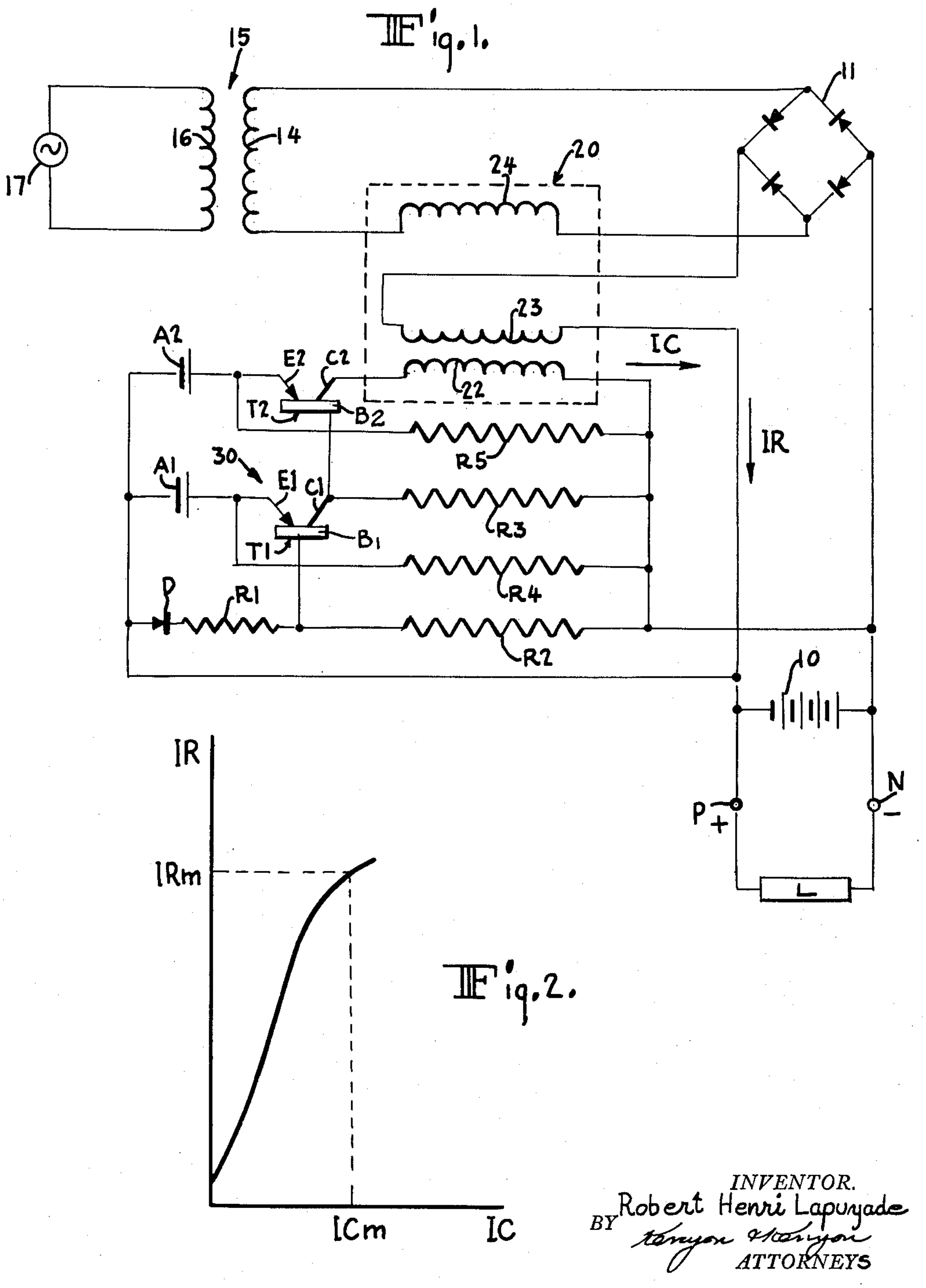
FIGURE 1 is a circuit diagram of a first embodiment of the invention used, for example, in charging a battery.
FIGURE 2 is a graph showing variation of the charging current as plotted against the monitoring current in the transducer of the system of FIGURE 1.

Referring now to the drawings and first to FIGURES 1 and 2 of the drawing, the system depicted in FIGURE 1 is partly similar to the system which has been described in the said application Serial No. 545,942 as the first embodiment of that invention. The following components are similar; a power supplying transformer 15, the primary winding 16 of which is energized by an alternator 17, and the secondary winding 14 of which is connected to the input of a rectifier 11, said rectifier, via its output, supplying the charging voltage and current to the storage battery 10, said storage battery 10 supplying power to a load L connected across its positive and negative terminals P and N. The components also include an electromagnetic amplifier or transducer 20, the winding 24 of which is in series with the secondary 14 and thus is energized by the alternating current supplied to the rectifier 11 from the secondary 14, said winding 24 acting as an opposing variable impedance to the said alternating current, said impedance varying as a function of the flux generated by a monitoring winding 22 of the transducer 20. Self-excitation of the transducer 20 is supplied by winding 23 in the output circuit of rectifier 11.

By varying the impedance of winding 24 the rectified output current IR from rectifier 11 may be varied from a very low value to the maximum allowed value $IR_m$ as a function of the value of the saturation of the magnetic circuit of the transducer 20, when the monitoring current IC flowing through winding 22 varies from a null or negligible value to a value $IC_m$. FIGURE 2 shows the rate of this variation.

According to the present improvement, the monitoring current IC flowing in monitoring coil 22 is supplied by a two-stage pre-amplifier system 30, said two stages comprising transistors T1 and T2, both in this embodiment of p-n-p type. This pre-amplifier 30 is so disposed as to detect and amplify the differences between a fraction of the output voltage of rectifier 11 and a standard reference voltage supplied, for example, by a small storage cell A1. This cell A1 should provide a constant and unvarying voltage. It may be of the sealed type described in Jeannin Patent No. 2,686,455, or any other type supplying an unvarying reference voltage.

To effect the desired amplifier action on the monitoring current, the emitter E1 and the collector C1 of the transistor T1 are connected in series with the cell A1 and with a resistor R3, across the rectifier output which constitutes the charging circuit for battery 10. A voltage proportional to the charging voltage by a factor determined by a voltage divider R1—R2 also connected across the rectifier output, is applied to the base B1 of the transistor T1.

A second transistor T2 cooperates in a similar way with a second similar cell A2, the base B2 of said transistor being connected to the collector C1 of the first transistor whereas the collector C2 of the second transistor is connected to the monitoring winding 22 of the transducer 20.

The storage cells A1 and A2 are charged from the rectifier 11 through resistors R4 and R5, respectively.

Resistor R1 of the voltage divider is so calculated that the voltage at its terminals is higher by 0.2 or 0.3 volt than the reference voltage supplied by cell A1. The transistor T1 is therefore polarized (between its emitter E1 and its base B1) in such a way that the resistance of its emitter-collector path E1—C1 is low compared to R3; the voltage between E1 and C1 amounts to a few tenths of a volt. The transistor T2 is polarized by the difference between the voltage at A2 and the voltage at C1.

The system which has just been described operates in the following way.

In case the output voltage of rectifier 11 decreases, the voltage at the terminals of resistor R1 decreases. The difference between the voltages at E1 and B1 thus decreasing, the resistance of the path E1—C1 of the transistor T1 increases. Therefore, the voltage between E1 and C1 increases, and as a result so does the polarization of transistor T2 between E2 and B2, which decreases the resistance of path E2—C2 of the transistor T2. This latter resistance, which is series connected with the monitoring winding 22 of the transducer 20, decreases and the monitoring current IC increases. This causes the impedance of coil 24 to decrease and hence an increase of the output current IR supplied by the rectifier 11. In this way, the output voltage of the said rectifier tends to increase.

In other words, if the output voltage of the rectifier 11 decreases, the monitoring current IC increases, thus causing an increase of current IR, and, as a consequence, of the output voltage of the rectifier.

When, on the other hand, the output voltage of the rectifier tends to increase, the opposite occurs: voltage across E1—B1 increases, voltage across E1—C1 decreases, the resistance between E2 and C2 increases, causing the decrease of the monitoring current IC. IC decreasing, IR decreases, so that the voltage supplied by the rectifier 11 decreases. The regulating system is therefore stable, since it tends to bring back the output voltage of rectifier 11 to its predetermined selected value when it diverges from the said value in either way.

Such a system, of a high sensitivity, is nevertheless influenced by the temperature variations of transistor T1. Thus an increase of temperature has the following effects upon T1: the polarization voltage E1—B1 needed to obtain a determined resistance E1—C1, decreases; the opposite current flowing from B1 to C1 increases.

The present invention provides for compensation of the temperature caused variations of voltage E1—B1 in order to remedy this drawback, in either of the following ways:

A germanium diode D having the same characteristics as the E1—B1 couple likened to a diode, is connected in series with resistor R1 (the resistance of R1 being suitably lowered). The voltage at the terminals of the compensating diode D then varies exactly in the same way as the voltage between E1 and B1 with temperature changes.

The temperature caused variation of the opposite current flowing from B1 to C1 may be compensated by using low resistance values for resistors R1 and R2, the current flowing through these resistors being then high enough to lessen satisfyingly the importance of the disturbance.

The hereabove described system is effective also for the regulation of an alternator driven at a variable speed such as the one which is referred to in the second embodiment of the invention described in the said copending application Serial No. 545,942. The transistor pre- amplifier being insensible to the variations of frequency, the system of the present invention provides a very good regulator.

As mentioned above and in the said copending application, the cells A1 and A2 may be storage cells having a very low capacity, comprising means for maintaining the electrolyte at a constant level, or gas tight alkaline cells, the electrodes of which are or are not provided with active material. They could be any other cell or means providing a constant and unvarying voltage, even when the current which flows through them varies over a large range of intensity.

Figure 3:
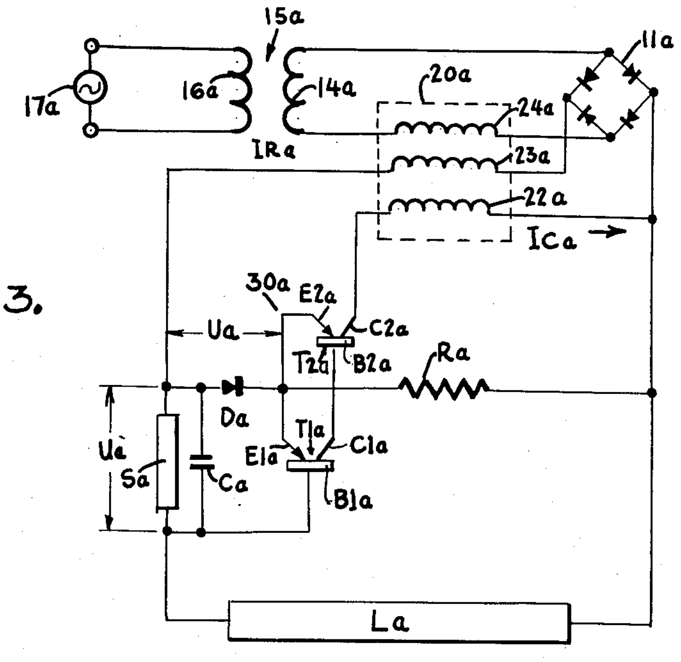
FIGURE 3 is a circuit diagram of a second embodiment of the invention.

In the system shown in FIGURE 3, the transistor preamplifier **30*a* is utilized in such a way in relationship to the D.C. output of the rectifier 11*a* which is supplied from an A.C. source 17*a* through primary and secondary coils 16*a* and 14*a* of a transformer 15*a* with the impedance coil 24*a* of the transducer 20*a* in series with the secondary 14*a* in the input circuit to rectifier 11*a***. The load circuit L*a* is energized by the output circuit rectifier **11*a* which draws its current from the A.C. source 17*a* via transformer 15*a***. The output current IR*a* of the rectifier also flows through the self exciting coil **23*a* of the transducer 20*a*** and also a low value resistance S*a* both in series with the load L*a*. The transducer **20*a* also includes the monitoring winding 22*a* through which current flow is regulated by amplifier system 30*a* to modify the excitation of the magnetic circuit of the transducer 20*a* and thus impedance of coil or winding 24*a*** as will be described.

The coil or winding **24*a*** constitutes a variable impedance which is used to act upon the intensity of the rectified current IR*a* so that it varies over a very large range, due to the variations of the controlled current IC*a* in the monitoring winding **22*a***.

The rectified current IR*a* flows through the resistor S*a* having a low resistance value and one terminal of which is connected to the base B1*a* of a first transistor T1*a* also of the p-n-p type in the embodiment shown here, the emitter electrode E1*a* of the said transistor being connected to the other terminal of the resistor S*a* through the means of a reference voltage supply device D*a*.

The said device D*a* is advantageously of a crystal diode (of germanium, silicon, selenium . . .) connected in a circuit across the terminals of the rectifier **11*a*** and being polarized through a resistor R*a* in the last named circuit; the said device D*a* may, if desired, be any type of stable voltage source, such as an electrolytic cell, e.g. a gas-tight alkaline cell of a type like cells A1 or A2 of FIGURE 1.

The collector C1*a* of the said first transistor T1*a* is connected to the base B2*a* of a second transistor T2*a*, the emitter E2*a* of which is also connected to the output terminal of the diode D*a*. Lastly, the collector C2*a* of the second transistor T2*a* is series connected with the monitoring winding **22*a* of the transducer 20*a***. The second transistor T2*a* is also of the p-n-p type in the example shown here.

The system of FIGURE 3 which has just been described operates in the following manner.

The crystal diode D*a* supplies a constant and unvarying voltage U*a* at its terminals, even when the current which flows through it varies in a large range of intensity. The resistor S*a* is gauged so that it causes a voltage drop *ua* which becomes higher than the voltage U*a* by a few tenths of a volt (e.g. 0.3 volt), when the current IR*a* reaches the predetermined maximum value which is meant as a limit to the current intensity.

When the current reaches this said maximum value the resistance of the transistor T1*a* becomes very low and a current may be drawn from it for energizing a device (relay, switch, other transistor, etc.) capable of interrupting or modifying the power supply of the load circuit.

In the embodiment shown here, the voltage E1*a*—C1*a* of transistor T1*a* is series connected in the polarization circuit of the second transistor T2*a* and this polarization voltage is therefore lowered when the resistance E1*a*—C1*a* of transistor T1*a* decreases. The intensity of the current then decreases across E2*a*—C2*a* of the transistor T2*a* which causes a decrease in the monitoring current through coil **22*a* of the transducer 20*a* and increases the impedance of the winding 24*a*** and thus causes the required voltage-drop across the terminals of the rectifier.

On the contrary, as long as the current IR*a* has an intensity lower than the predetermined maximum value, the transistor T1*a* is very faintly polarized and its resistance is very high, so that its effect is negligible on the transistor T2*a* which supplies the monitoring current.

In order to improve the operation of this device, the voltage at the terminals of the ressitor S*a* is filtered by a capacitor C*a* which shunts the pulses of the rectified current. This capacitor may be replaced by an electrolytic cell.

It will be seen that this system of FIGURE 3 utilizes a resistor S*a* of a low resistance value, inserted in the load circuit, one of the terminals of the said resistor S*a* being connected, through an electric device D*a* supplying a reference or standard voltage, to the emitter E1*a* of a transistor T1*a*, and the other terminal of the said resistor S*a* being connected to the base B1*a* of the said transistor, whereas the signal to the transistor T2*a* is controlled through the collector C1*a* of the said transistor T1*a*.

In the said system, when, because of an increase of the current the voltage-drop *ua* in the said resistor S*a* reaches a value approximating that of the reference voltage U*a*, and then goes beyond it, the resistance between the emitter E1*a* and the collector C1*a* varies from a very high value to a very low one, so that an appreciable current which may be used for limiting the intensity, may be drawn from the collector C1*a* of the transistor T1*a* and used advantageously to control transistor T2*a*.

In the advantageous embodiment of the invention as disclosed in FIGURE 3, the collector C1*a* of the first transistor T1*a* is connected to the base B2*a* of the second transistor T2*a*, the collector C2*a* of which supplies a current to the monitoring winding 22*a* of the transducer 20*a*, the said transducer having its impedance coil 24*a* inserted in a circuit having an alternating voltage source supplying current to a rectifier 11*a*, the said rectifier supplying current to the D.C. load circuit L*a*.

With this arrangement, the resistance drop in the first transistor T1*a* causes a decrease in the polarization of the second transistor T2*a* and consequently an increase of its resistance, which lowers the intensity of the current IC*a* in the monitoring winding 22*a* of the transducer 20*a*, and therefore increases the impedance of the said transducer and lowers the voltage at the rectifier terminals.

The overintensities may be thus neutralized and the rectifier 11*a* is practically protected against them.

Due to the several amplification stages of the transistors and of the transducer, the lowering of the voltage at the rectifier terminals is able to bring back the intensity to a normal value even in the case of a short-circuit.

The monitoring current may be modified by acting upon the polarization of the second transistor through other means, for example, to keep the voltage of the rectifier at a constant value so that the IR*a* current varies between accepted limits as will now be described.

Figure 4:
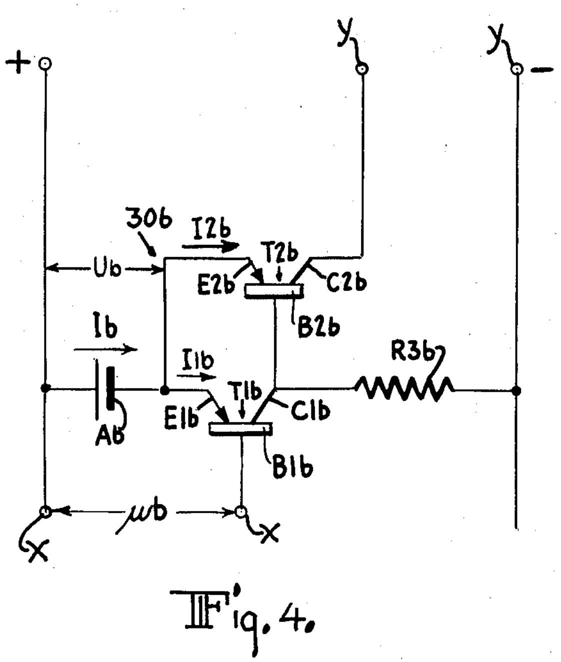
FIGURE 4 is a circuit diagram illustrating principles of operation of the amplifier system of the invention.

In the amplifier circuit 30*b* shown in FIGURE 4 the base B1*b* of the transistor T1*b* (of the p-n-p type in the embodiment shown) constituting a first amplifying stage is submitted to a voltage *ub* applied to the input terminals *x*—*x* of the system, the variations of the said voltage being those which are to be amplified in comparison with a reference value U*b* supplied by a counter electromotive source A*b* connected to the emitter E1*b* of the said transistor T1*b*. The said transistor is consequently polarized by the difference U*b*—*ub* and has an output voltage *k*(U*b*—*ub*) at its terminals E1*b*—C1*b*, *k* being the amplification factor of transistor T1*b*.

The counter electromotive source force A*b* may be an ordinary primary battery presenting an appreciable internal resistance. This source may be more advantageously constituted by an element such as an electrolytic cell having a low internal resistance like A1 or A2 as hereinbefore described and adapted in such a way that it supplies at its terminals a constant and unvarying voltage even when the current which flows through it varies over a large range of intensity; in such a case it will be necessary to insert a resistor (not shown), series connected with the element A*b* so that the volt-amperemetric characteristic of the whole presents a slope, as shown on FIGURE 5, the slope varying according to the resistance value of the resistor.

The collector C1*b* of transistor T1*b* is connected to the base B2*b* of a transistor T2*b* (also of the p-n-p type in the example shown here) constituting a second amplification stage, whereas the emitter E2*b* of said transistor T2*b* is parallel-connected with the emitter E1*b*. The polarization of transistor T2*b* is therefore equal to the voltage at the output terminals E1*b*—C1*b* of the transistor T1*b*, i.e. to *k*(U*b*—*ub*).

The current supplied by the amplifier circuit 30*b* is collected on collector C2*b* of the transistor T2*b*, *y*—*y* being the output terminals of the said amplifier system.

The amplifier system which has just been described operates in the following manner:

For a given value of voltages U*b* and *ub* a corresponding polarization of the transistor T1*b* exists, and consequently a given current I1*b* flows through it. There is as well a corresponding polarization of the transistor T2*b* and a given current I2*b* flows through the latter. The sum of the two currents I1*b* and I2*b* is equal to the current I*b* which flows through the reference device A*b* and which corresponds in fact to the given value of voltage U*b*. On the characteristic curve shown in FIGURE 5, I*o* and U*o* represent the values thus defined of the current I*b* and the voltage U*b*, for the given voltage *ub*.

When the voltage *ub* increases above this given value, the polarization of the transistor T1*b* increases, which decreases the resistance across E1*b*—C1*b* of the said transistor and increases the current I1*b* which flows through it. Therefore, the current I*o* tends to become I*p* and the operating point tends to pass from *o* to *p* on the characteristic curve of FIGURE 5, which would result in a slight increase of the voltage U*b* applied to the emitter E1*b*.

However, the resistance of T1*b* being decreased, the voltage E1*b*—C1*b* and consequently the polarization of the second transistor T2*b* decrease, which results in an increased resistance across E2*b*—C2*b* of the latter. The current I2*b* which flows through transistor T2*b* decreases therefore to a greater value than the value which the current I1*b* had increased, since it occurs to the second amplification stage. The operating point reaches then the point *q* on the voltamperemetric characteristic curve and it appears that the voltage applied to the emitter E1*b* finally decreases compared to the original voltage U*o*.

In this way, an increase in the voltage *ub* is accompanied by a decrease in the voltage U*b*, which increases the variation of the polarization voltage U*b*—*ub* of the transistor T1*b* and, as a consequence, the sensitivity of the amplifier system 30*b*.

The inverted occurrences take place when the voltage *ub* decreases. In this case, the polarization of transistor T1*b* decreases, which increases its resistance and consequently the polarization voltage E1*b*—C1*b* for transistor T2*b*. The resistance of transistor T2*b* decreases and I2*b* increases. For slight decreases in the current I1*b* which flows through T1*b*, very high increases of the current I2*b* which flows through T2*b* result and consequently result in increase of current I*b* and, therefore, of the voltage U*b*. As a consequence, a decrease in the voltage *ub* provides corresponding increase of the voltage U*b* and a bigger variation of the difference U*b*—*ub*.

To sum up, every variation in one way of *ub* is accompanied by a variation in the other way of U*b*, which results for the function U*b*—*ub* which commands the operation of the amplifier 30*b*, in giving it a variation, the amplitude of which is substantially larger than the amplitude of the variations of *ub* alone.

The amplifier system 30*b* has therefore, a high sensitivity and is particularly suitable when the load voltage (between + and −) is very high is comparison with the voltage of the reference element A*b*. In this way, reference element of about 1.40 volts may be perfectly suitable for controlling voltages of 28 or 56 volts as an example.

Figure 6:
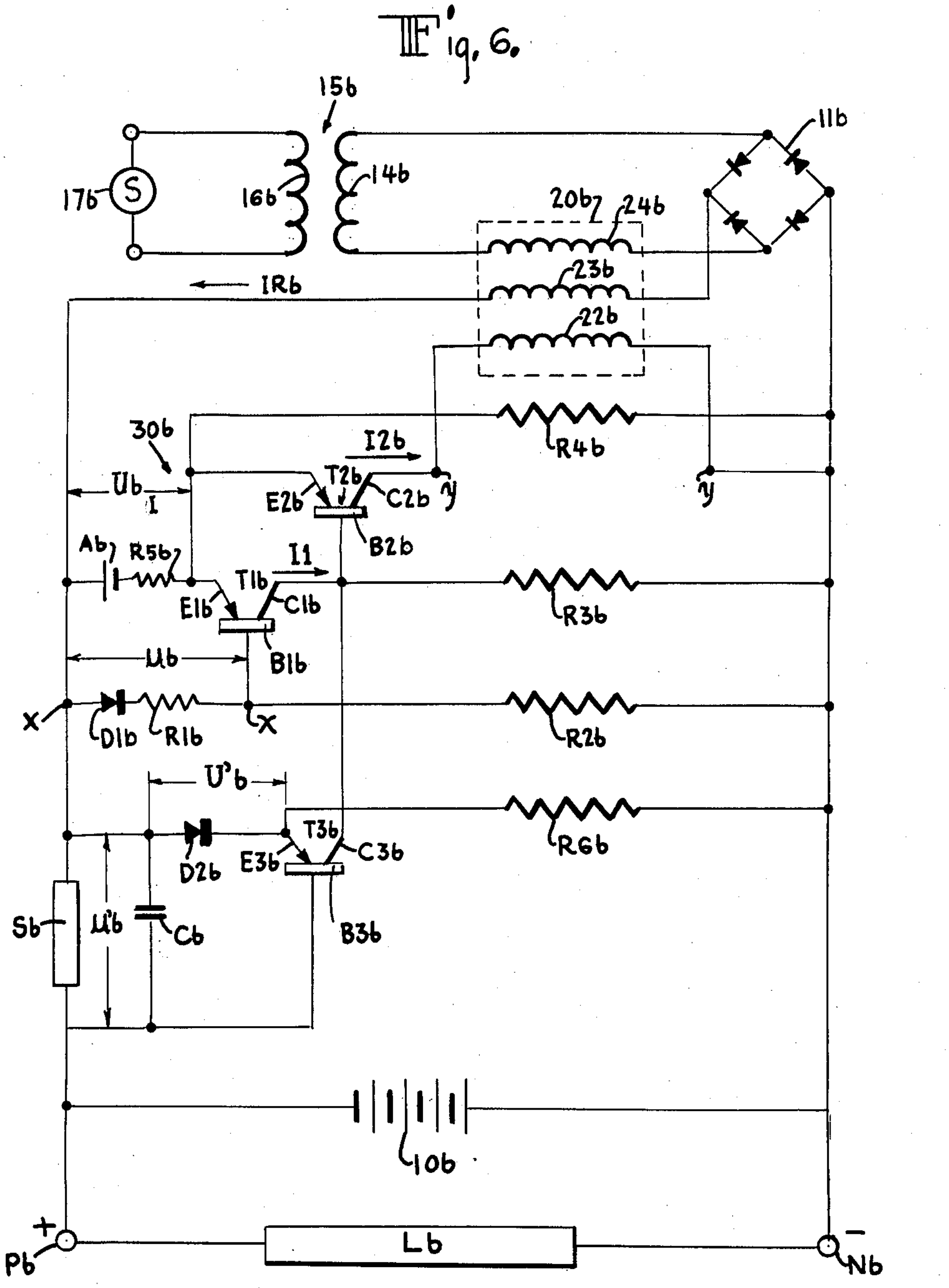
FIGURE 6 is a circuit diagram of a voltage regulating system including a transistor amplifier system like that of FIGURE 4 as used for control in the charging of a storage battery.

FIGURE 6 shows an application of the transistor amplifier system 30*b* to the regulating of the voltage of a charging system for a storage battery.

The system of FIGURE 6 is partly similar to the one which has been described by the applicant in his U.S. application, Serial No. 545,942 of November 2, 1955.

The following features are the same: the power supplying transformer 15*b*, the primary winding 16*b* of which is energized by the alternating current source 17*b* and the secondary winding 14*b* which is connected to the input of a rectifier 11*b*, said rectifier through its output circuit supplying the charging voltage to the storage battery 10*b*, said storage battery supplying power to a load L*b* connected across its positive and negative terminals P*b* and N*b*. The system includes magnetic amplifier or transducer 20*b*, the impedance winding 24*b* of which is in series with the secondary 14*b* and is energized by the alternating current supplied to the rectifier 11*b*, said winding 24*b* providing an impedance to the said alternating current, said impedance varying as a function of the flux generated by the monitoring winding 22*b*, the self excitation being supplied by winding 23*b*.

By varying the impedance 24*b*, the rectified current IR*b* may be varied in a very large range of intensity as a function of the excitation of the magnetic circuit, when the monitoring current flowing through the winding 22*b* varies.

Figure 5:
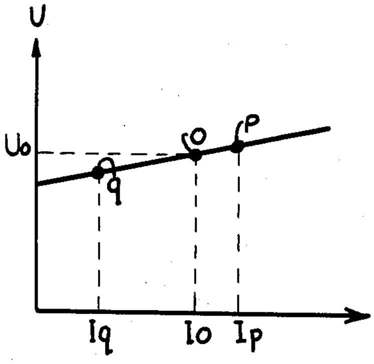
FIGURE 5 is a graph illustrating volt-amperemetric characteristics of the amplifier system.

According to the present invention, the said monitoring current which is represented by I2*b* is supplied by the transistor amplifier system 30*b* of FIGURE 4 including transistors T1*b*, and T2*b* adapted so that it detects and amplifies the differences between a fraction of the output voltage of rectifier 11*b* across *x*—*x* and the reference voltage supplied by a small storage cell A*b* through a resistor R5*b*, which has a resistance value of a few ohms and which causes a sloping of the voltamperemetric characteristic, as explained regarding FIGURES 4 and 5.

To this effect, the transistor T1*b* is series connected with the reference device A*b*—R5*b* on one side and with a resistor R3*b* on its other side, across the rectifier output terminals of the charging circuit of battery 10*b*. The base B1*b* of the transistor is under the charging voltage modified by a proportionality factor determined by the voltage divider R1*b*—R2*b*.

As in the example of FIGURE 4, the second transistor T2*b* has its emitter E2*b* connected to the reference device A—R5*b* in parallel with the connection to emitter E1*b* of transistor T1*b*, the base B2*b* of said transistor T2*b* being connected to the collector C1*b* of the first transistor T1*b*, whereas the collector C2*b* of transistor T2*b* is connected to the monitoring winding 22*b* of the transducer.

The storage cell A*b* is charged through a resistor R4*b*.

The diode D1*b* functions for the same purpose as diode D of FIGURE 1.

The resistance R1*b* of the voltage divider is gauged in such a way that the voltage drop at the terminals *x*—*x* is higher by about 0.2 to 0.3 volt than the voltage supplied by the reference device A*b*—R5*b* at a normal rate (point $\overline{0}$ on FIGURE 5). The transistor T1*b* is therefore polarized in such a way that its resistance is low compared to that of R3*b*; the voltage between E1*b* and C1*b* is of the order of a few tenths of a volt.

The system on FIGURE 6 operates in the following way:

As has been seen, in the case of the output voltage of rectifier 11*b* increasing, which results in an increase of the voltage *ub* at the terminals *x*—*x*, the current I2*b* supplied by the transistor amplifier system 30*b* to the monitoring winding 22*b* decreases markedly, which results in an increase of the variable impedance 24*b* and therefore in a decrease of the current IR*b* supplied by the rectifier 11*b*. In this way the output voltage of said rectifier 11*b* tends to decrease so that it may be brought back to the predetermined value.

When, on the contrary, the said output voltage of rectifier 11*b* falls below the predetermined value, inverted occurrences are produced; the voltage *ub* decreases and, as a consequence, the current I2*b* increases markedly. The varying impedance 24*b* then decreases, the current IR*b* supplied by rectifier 11*b* increases and so does the voltage at the terminals of said rectifier.

The regulating system is therefore stable since it tends to bring back the output voltage of rectifier 11*b* to its predetermined value when the said voltage varies from the said predetermined value in either way. On the other hand, this system is endowed with a high sensitivity since the changes in *ub* result in inverted changes in U*b*, which increases the amplitude of the signal applied to the input terminals of the transistor amplifier.

This system is nevertheless subjected to the effects of changes in temperature on the transistor T1*b*. Thus, an increase of the temperature results in lowering the transistor T1*b* polarization voltage necessary to obtain a predetermined voltage between E1*b* and C1*b*. An increase of the temperature results in a lowering of the resistance of T1*b*.

To correct this drawback, the variations in the voltage drop between E1*b*—B1*b*, due to the changes of the temperature, are compensated by series connecting with resistance R1*b* (and accordingly lowering the resistance value of R1*b*) a crystal diode D1*b* which has the same characteristics as the couple E1*b*—B1*b*, said couple being similar to a diode. The voltage at the terminals of the compensating diode D1*b* varies then exactly like the voltage drop E1*b*—B1*b* as a function of the temperature, and in this way this diode D1*b* like diode D of FIGURE 1 neutralizes the effects of temperature on transistor T1*b*.

It may be necessary, in some cases, particularly when the alternating voltage of the A.C. supply is not stable, to limit the current IR*b* supplied by the rectifier 11*b* to the storage battery 10*b* or to the load circuits L*b* connected to the terminals P*b*—N*b*.

To this effect, according to the present invention, a low resistance S*b* (a few hundredths of an ohm) is series inserted in the charging circuit and a crystal diode D2*b* series connected with a resistor R6*b* is connected across the terminals of this charging circuit (rectifier output) to one of the terminals of resistor S*b*. The other terminal of resistor S*b* is connected to the base B3*b* of a third transistor T3*b* (also of the p-n-p type in the example shown here), the emitter E3*b* of said transistor T3*b* being connected to the output terminal of diode D2*b*, whereas its collector C3*b* is connected to the base B2*b* of transistor T2*b*.

The diode D2*b* charged through the resistor R6*b* supplies at its terminals a constant and unvarying voltage U'*b*, even when the current which flows through it varies in a large range of intensities. The resistance S*b* is gauged in such a way that it causes a voltage drop *u'b*, which becomes higher of by a few tenths of a volt, e.g. 0.3 volt, than the voltage U'*b* when the current IR*b*, which flows through this resistance S*b*, reaches the predetermined maximum value to which this current is meant to be limited.

The resistance of the transistor T3*b* becomes then very low and the voltage E3*b*—C3*b* decreases. As C3*b* is connected to B2*b*, the polarization of the transistor T2*b* decreases, which results in a lowering of the monitoring current I2*b* of the transducer. The output rate IR*b* of the rectifier is, as a consequence, reduced and automatically limited to the predetermined value.

On the contrary, as long as the current IR*b* remains lower than the predetermined value, the transistor T3*b* is faintly polarized and its resistance is high.

In this way, the transistor T3*b* acts to modify the polarization of the transistor T2*b* only when the current IR*b* tends to over reach the predetermined maximum value. Below this value, the transistor T3*b* does not interfere and the amplifier system 30*b* comprising transistors T1*b* and T2*b* operates as has been above described.

To insure a correct operation of the intensity limiter system of transistor T3*b*, the voltage at the terminals of the resistor S*b* is filtered by a capacitor C*b* (this is due to the fact that the voltage is not a direct-current voltage but a pulsing rectified-A.C. current voltage). It would also be advantageous in some instances to substitute an electrolytic cell similar to the cell A*b*, for the capacitor C*b*.

In the same way, an electrolytic cell, similar to A*b*, could be substituted to the crystal diode D2*b*, and inversely, any other element able to supply a constant and unvarying voltage even when the current which flows through it varies over a large range, could possibly be used.

The systems of FIGURES 4 and 6 relate to amplifying arrangements comprising a first transistor or crystal triode the base of which receives the signal intended for amplification, whereas its emitter is connected to a reference device comprising a source of counter electromotive force, the collector of the said first transistor being connected to the base of a second transistor, the emitter of which is also connected to the reference device, the amplified signal being collected on the collector of the second transistor.

These systems use the internal resistance (which is never non-existent) of the said source of counter-electromotive force, with the possibility of reinforcing the effect of this resistance by series connecting an auxiliary resistance.

Indeed, the existence of the said internal resistance, eventually increased by a series connected auxiliary resistance, causes a slope in the volt amperemetric characteristic of the reference device. The said device may thus advantageously comprise an electrolytic cell, e.g. an alkaline gas-tight cell or any other element such as a crystal diode (germanium, silicon, selenium, etc.) capable of supplying a constant and unvarying voltage even when the current which flows through it varies over a large range.

The transistor amplifier system is applicable to voltage regulating as indicated in FIGURE 6, due to its high sensitivity. In such application the reference device voltage is compared with the source voltage which is meant to be maintained at a constant value and which is applied, with a proportionality coefficient, to the base of the first transistor, the amplified signal issuing from the second transistor being then used for monitoring the means provided for acting upon the voltage of the said source.

Figure 7:
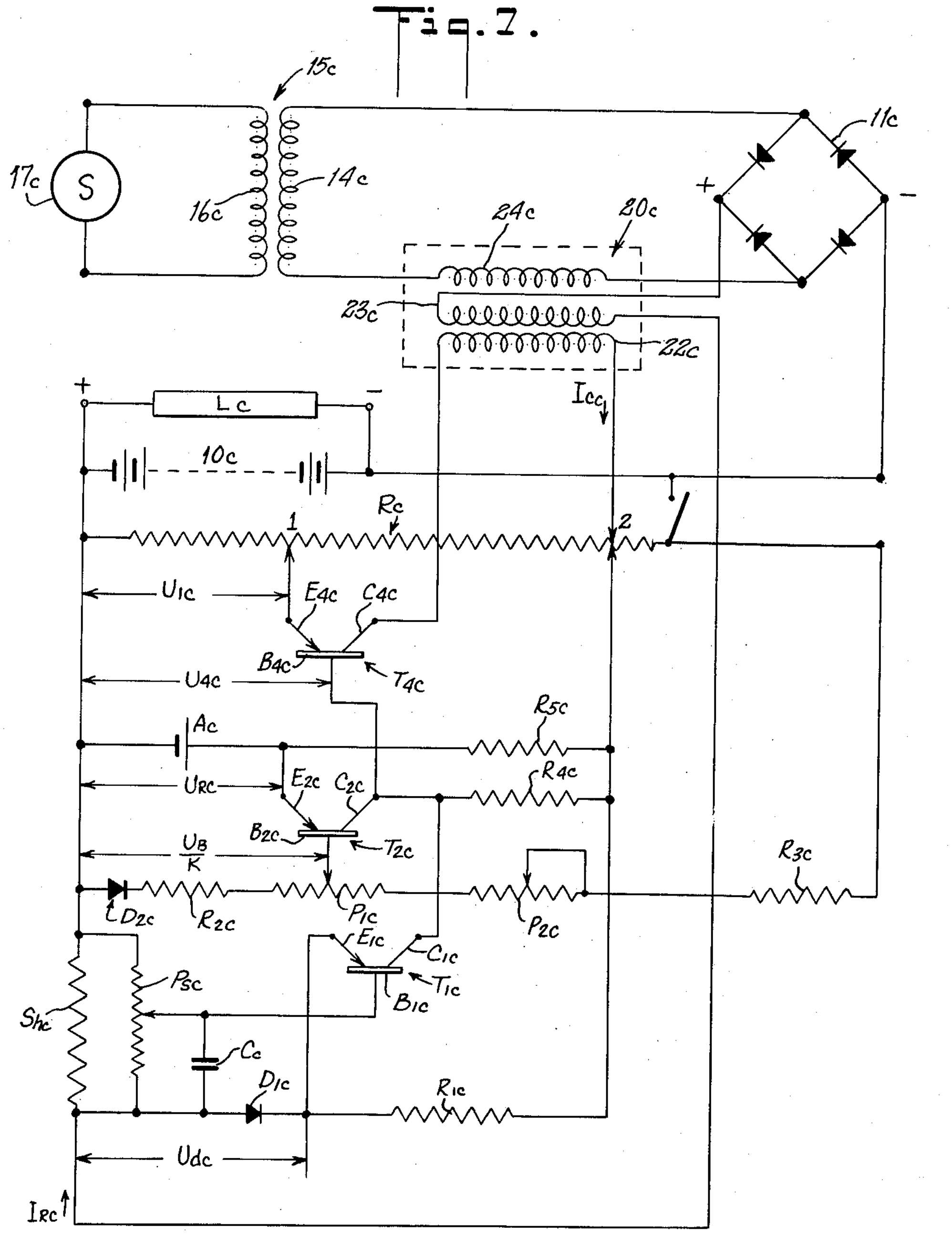
FIGURE 7 is a circuit diagram of a modified amplifier system in conjunction with a charging system for controlling the monitoring current through the transducer.

In order to provide highly stable operation and sensitivity of the systems, the pre-amplifier transistor arrangement which regulates the monitoring current in the monitoring coil of the transducer may be modified in accord with the showing of FIGURE 7.

In this embodiment a ballast resistor R*c* is connected across the output terminals of the rectifier and has taps 1 and 2. A transistor pre-amplifier system 30*c* is used for regulating the monitoring current in the monitor coil 22*c* of the transducer 20*c*. The low direct current voltage for energizing the monitoring coil 22*c* is taken between the terminals 1 and 2 of the ballast resistor R*c* at a voltage of about 10 volts.

The emitter collector circuit E4*c*—C4*c* of the transistor T4*c* whose resistance varies as a function of the polarization of said transistor (voltage U4*c*—U1*c*), is connected in series with said monitoring winding 22*c*.

If the said polarization is high, the resistance of the emitter collector circuit E4*c*—C4*c* of transistor T4*c* is very low and the monitoring winding is energized by about 9.5 volts (10 v.–0.5 v.) and high IC*c* current.

If on the contrary, said polarization of transistor T4*c* is high, the resistance of the said emitter collector circuit E4*c*—C4*c* of transistor T4*c* is very high and therefore, the monitory current IC*c* is practically nonexistent.

Between these two extremes, (maximum monitoring current and non-existent monitoring current) a continuous variation of the monitoring current is obtained as a function of the variations of the polarization of transistor T4*c*.

The transistor T4*c* which directly controls the monitoring current IC*c* in the monitoring coil 22*c* of transducer 20*c* in turn is controlled either (*a*) by transistor T2*c* for voltage regulation
(*b*) by transistor T1*c* for intensity regulation As regards voltage regulation, the reference voltage UR*c* is derived from the source of standard voltage which as shown is the cell A*c* of the type hereinbefore mentioned, which is connected to the emitter E2*c* of the transistor T2*c*. The collector C2*c* is connected to the base B4*c* of transistor T4*c*. The base B2*c* is connected to receive comparing voltage $$\frac{\mathrm{UB}}{k}$$

as measured across the diode D2*c* resistance B2*c* and potentiometer P1*c*.

When transistor T2*c* is polarized by $$\frac{UB}{k}-UR_o=E$$

(about 0.25 volt), the resistance of its emitter collector circuit E2*c*—C2*c* is high. Therefore, the voltage across this circuit is high. In consequence U4*c*=UR*c*+voltage across E2*c*—C2*c* is greater than U1*c*. The transistor T4*c* thus is polarized by a voltage equal to U4*c*—U1*c* and is open and allows monitoring current IC*c* to flow through the monitoring coil 22*c* of the transducer 20*c*.

When UB increases $$(k\Delta u), \frac{UB}{k} \text{ increases } \Delta u$$

Then transistor T2*c* is polarized by $E+\Delta U$.

In consequence the voltage across E2*c*—C2*c* decreases and so does U4*c*. The polarization of transistor T4*c* then decrease and this results in lowering of the monitoring current IC*c* in the transducer coil 22*c*. Thus rectifier voltage changes are controlled and regulated.

For current regulation purposes transistor T1*c* is used. The rectifier output is controlled by the shunt S*hc* across whose terminals the regulating potentiometer P*sc* is connected. The capacitor C*c* has a steadying or filtering effect on voltage taken from the shunt S*hc* through the arm of potentiometer P*sc*.

The diode rectifier D1*c* charged at a constant intensity through resistor R1*c* has a substantially constant terminal voltage U*dc* of the order of 0.4 volt.

Transistor T1*c* is polarized by the difference between voltage U*psc* and U*dc*.

When U*psc*—U*dc* is equal to or less than about 0.2 v. the resistance between emitter E1*c* and collector C1*c* is very high and hence transistor T1*c* has no effect on transistor T4*c* and on monitoring current regulation.

However, when U*psc*—U*dc* equals about 0.3 v. (which corresponds to the nominal output of the rectifier through shunt S*hc*) the resistance between emitter E1*c* and collector C1*c* of transistor T1*c* is low hence the voltage at collector C1*c* which is connected to the base B4*c* of transistor T4*c* is lowered and thus decreases the polarization of transistor T4*c* which results in increasing the resistance across E4*c*—C4*c* and lowering the monitoring current IC*c* flowing in the transducer coil 22*d* and thus increasing the impedance of transducer coil 24*c* and thus in decreasing the rectifier output current IR*c*.

The arrangement of FIGURE 7 thus provides dual control for monitoring current flow in transducer coil 22*c* as permitted by transistor T4*c* whose polarization in turn is responsive to voltage changes through polarization action of transistor T2*c* and current changes through polarization action of transistor T1*c*.

The embodiment of FIGURE 7 like those of FIGURES 1, 4, 5 and 6 is characterized by utilization of p-n-p type transistors arranged in cascade whereby the base of the monitoring coil transistor is polarized by the collector of another transistor. In FIGURE 7, the emitter of the transistor T2*c* is polarized by the voltage supply URc of a standard cell A*c* while the emiter of the transistor T4*c* is polarized by the voltage U1*c* drawn from the general balltst potentiometer R*c* rather than as in FIGURE 1 from a cell A2. It is essential that UR*c* be very constant in value. It is less essential for U1*c* although reasonable stability is required for the voltage U1*c*. Since the current drawn from the ballast resistor R*c* for voltage U1*c* is very weak (about 40 to 80 milliamperes) in relation to the several ampere current passing through the ballast resistor R*c*, sufficient stability for the voltage U1*c* is established and a second standard cell like cell A2 as used in the system of FIGURE 1 is not necessary. The arrangement of FIGURE 7 is, in fact more advantageous since tendencies toward instability in operation are eliminated.

In the arrangement when a second cell A2 is used in the polarization of transistor T2 it is necessary that A2 should be of such a nature that it supplies a much definitely stronger electromotive force than A1, because if A1 must furnish an output of 10 milliamperes, A2 is required to furnish a definitely higher output of 80 to 100 milliamperes because of the amplification factor. The system is thus ultrasensitive and requires cells such as A2 to have a stable voltage for a much higher output. There is also the risk that the electromotive force of A2 may be weaker than A1.

It is to be noted that in FIGURES 4 and 6 the emitters of the transistors T2*b* require a higher voltage than cell A*b* for the same reasons. This again makes for an ultra sensitive system that may be unstable on occasion. The modification of FIGURE 7 eliminates such difficulties as well as the requirement for two cells and provides most stable operation.

With the arrangement of FIGURE 7 the ballast resistor R*c* shunts the terminals of the battery 10*c*.

This arrangement is designed mainly to supply a monitoring current which varies the impedance of the transducer. Thus the impedance of the circuit is never infinite as there is always a residual current which can flow through the ballast resistor R*c* of at least 1 ampere. Thus the ballast resistor can absorb excess current which should not enter the battery.

Another advantage of the system of FIGURE 7 is that stable potential for operating the transistors can be derived from it. Thus the potential U1*c* which is greater than the potential UR*c* can be drawn from the ballast resistor R*c*.

Another advantage of the system of FIGURE 7 is that it can be applied for use with generator voltages ranging from 10 to 220 volts including the most common ranges of 110 and 220 volts without requiring resort to auxiliary sources as is necessary in some known systems. The only changes required for differing voltages in the ranges mentioned are in the values of resistances R*c* and R3*c*.

As has been pointed out above, the voltage U1*c* which affects the transistor T4*c* is substantially stable because it is tapped from a resistance R*c* wherein a current of at least 1 ampere always flows, while the current tapped from it is at most about 0.1 ampere. Thus the departure from stability is of the order of 5 in 1000. Practically stable voltage, therefore, exists.

Summarizing, the arrangement of FIGURE 7 is advantageous because (1) The potential U1*c* derived from the ballast resistor R*c* is practically constant.

(2) There is no need for an auxiliary power source.

(3) The system is readily adaptable for battery voltages and power supplies ranging from 10 to 220 volts.

(4) Maximum voltage regulating sensitivity is secured utilizing only two transistors.

While specific embodiments of the invention have been described, variations in detail within the scope of the appended claims are possible and are contemplated.

What is claimed is:

1. In a control system having a voltage and current supply and having a transducer provided with both a variable impedance coil for affecting the voltage and current of the supply and a monitoring coil through which variable monitoring current may flow to vary said impedance, transistor amplifier means including a pair of like transistors connected in cascade, a source of reference voltage, circuit means for applying the changeable difference between a fraction of the changeable voltage of the supply and the reference voltage to a first of said transistors to affect its extent of polarization, circuit means connecting the first transistor to the second transistor so that the extent of polarization of the first transistor affects the extent of polarization of said second transistor, circuit means connecting said second transistor to said monitoring coil so that monitoring current may flow through the latter as a function of the extent of polarization of said second transistor, a third transistor, a second source of reference voltage, a shunt resistor connected to the supply, means connected across said resistor for providing a voltage proportional to a change of current flowing through said resistor, means for applying the difference between said last named voltage and said second reference voltage to said third transistor to affect its extent of polarization, and circuit means connecting said third transistor to said second transistor so that the extent of polarization of the third transistor which is responsive to current changes of the supply also affects the extent of polarization of said second transistor whereby the flow of monitoring current in the monitoring coil is controlled both by changes of voltage and of current of the supply.

2. In a control system having a voltage and current supply and having a transducer provided with both a variable impedance coil for affecting the voltage and current of the supply and a monitoring coil through which variable monitoring current may flow to vary said impedance, transistor amplifier means including a pair of like transistors connected in cascade, a source of reference voltage, circuit means for applying the changeable difference between a fraction of the changeable voltage of the supply and the reference voltage to a first of said transistors to affect its extent of polarization, circuit means connecting the first transistor to the second transistor so that the extent of polarization of the first transistor affects the extent of polarization of said second transistor, circuit means connecting said second transistor to said monitoring coil so that monitoring current may flow through the latter as a function of the extent of polarization of said second transistor, a third transistor, a second source of reference voltage, a shunt resistor connected to the supply, means connected across said resistor for providing a voltage proportional to a change of current flowing through said resistor, means for applying the difference between said last named voltage and said second reference voltage to said third transistor to affect its extent of polarization, and circuit means connecting said third transistor to said second transistor so that the extent of polarization of the third transistor which is responsive to current changes of the supply also affects the extent of polarization of said second transistor whereby the flow of monitoring current in the monitoring coil is controlled both by changes of voltage and of current of the supply, the first and second transistors both being energized by the first-named sources of reference voltage.

3. In a control system having a voltage and current supply and having a transducer provided with both a variable impedance coil for affecting the voltage and current of the supply and a monitoring coil through which variable monitoring current may flow to vary said impedance, transistor amplifier means including a pair of like transistors connected in cascade, a source of reference voltage, circuit means for applying the changeable difference between a fraction of the changeable voltage of the supply and the reference voltage to a first of said transistors to affect its extent of polarization, circuit means connecting the first transistor to the second transistor so that the extent of polarization of the first transistor affects the extent of polarization of said second transistor, circuit means connecting said second transistor to said monitoring coil so that monitoring current may flow through the latter as a function of the extent of polarization of said second transistor, a third transistor, a second source of reference voltage, a shunt resistor connected to the supply, means connected across said resistor for providing a voltage proportional to a change of current flowing through said resistor, means for applying the difference between said last named voltage and said second reference voltage to said third transistor to affect its extent of polarization, and circuit means connecting said third transistor to said second transistor so that the extent of polarization of the third transistor which is responsive to current changes of the supply also affects the extent of polarization of said second transistor whereby the flow of monitoring current in the monitoring coil is controlled both by changes of voltage and of current of the supply, a ballast resistor connected in parallel with the supply, the second transistor being energized from a tap of said ballast resistor, the first transistor being energized by said first source of reference voltage and the third transistor being energized by said second source of reference voltage.

4. In a control system having a voltage and current supply and having a transducer provided with both a variable impedance coil for affecting the voltage and current of the supply and a monitoring coil through which variable monitoring current may flow to vary said impedance, transistor amplifier means including a pair of like transistors connected in cascade, a source of reference voltage, circuit means for applying the changeable difference between a fraction of the changeable voltage of the supply and the reference voltage to a first of said transistors to affect its extent of polarization, circuit means connecting the first transistor to the second transistor so that the extent of polarizaion of the first transistor affects the extent of polarization of said second transistor, circuit means connecting said second transistor to said monitoring coil so that monitoring current may flow through the latter as a function of the extent of polarization of said second transistor, a third transistor, a second source of reference voltage, a shunt resistor connected to the supply, means connected across said resistor for providing a voltage proportional to a change of current flowing through said resistor, means for applying the difference between said last named voltage and said second reference voltage to said third transistor to affect its extent of polarization, circuit means connecting said third transistor to said second transistor so that the extent of polarization of the third transistor which is responsive to current changes of the supply also affects the extent of polarization of said second transistor whereby the flow of monitoring current in the monitoring coil is controlled both by changes of voltage and of current of the supply and diode means to render operation of the system independent of temperature caused changes of operating characteristics of said first transistor.

5. In a control system having a voltage and current supply and having a transducer provided with both a variable impedance coil for affecting the voltage and current of the supply and a monitoring coil through which variable monitoring current may flow to vary said impedance, transistor amplifier means including a pair of like transistors connected in cascade, a source of reference voltage, circuit means for applying the changeable difference between a fraction of the changeable voltage of the supply and the reference voltage to a first of said transistors to affect its extent of polarization, circuit means connecting the first transistor to the second transistor so that the extent of polarization of the first transistor affects the extent of polarization of said second transistor, circuit means connecting said second transistor to said monitoring coil so that monitoring current may flow through the latter as a function of the extent of polarization of said second transistor, a third transistor, a second source of reference voltage, a shunt resistor connected to the supply, means connected across said resistor for providing a voltage proportional to a change of current flowing through said resistor, means for applying the difference between said last named voltage and said second reference voltage to said third transistor to affect its extent of polarization, circuit means connecting said third transistor to said second transistor so that the extent of polarization of the third transistor which is responsive to current changes of the supply also affects the extent of polarization of said second transistor whereby the flow of monitoring current in the monitoring coil is controlled both by changes of voltage and of current of the supply and resistor means whose resistance changes with temperature to render operation of the system independent of temperature caused changes of operating characteristics of said first transistor.

6. In a control system having a voltage and current supply and having a transducer provided with both a variable impedance coil for affecting the voltage and current of the supply and a monitoring coil through which variable monitoring current may flow to vary said impedance, transistor amplifier means including a pair of like transistors connected in cascade, a source of reference voltage, circuit means for applying the changeable difference between a fraction of the changeable voltage of the supply and the reference voltage to a first of said transistors to affect its extent of polarization, circuit means connecting the first transistor to the second transistor so that the extent of polarization of the first transistor affects the extent of polarization of said second transistor, circuit means connecting said second transistor to said monitoring coil so that monitoring current may flow through the latter as a function of the extent of polarization of said second transistor, a third transistor, a second source of reference voltage, a shunt resistor connected to the supply, means connected across said resistor for providing a voltage proportional to a change of current flowing through said resistor, means for applying the difference between said last named voltage and said second reference voltage to said third transistor to affect its extent of polarization, and circuit means connecting said third transistor to said second transistor so that the extent of polarization of the third transistor which is responsive to current changes of the supply also affects the extent of polarization of said second transistor whereby the flow of monitoring current in the monitoring coil is controlled both by changes of voltage and of current of the supply, said transistors each being of the p-n-p type each having a base, an emitter and a collector, the collectors of the first and third transistors both being connected to the base of the second transistor and the monitoring coil being connected in series with the emitter and collector of the second transistor.

7. In a control system having a voltage and current supply, a first transistor of the p-n-p type having a base, an emitter and a collector, a second transistor of the same type also having a base, an emitter and a collector, a cell source of constant voltage for applying fixed potentials to the emitters, means for applying a variable potential between the base and emitter of the first transistor, connection between the collector of the first transistor and the base of the second transistor whereby current flow across the emitter collector of the first transistor provides an amplified voltage at the base of the second transistor and thereby causes a variable amplified current flow across the emitter collector of the second transistor, a third transistor of the same type having a base, an emitter and a collector and whose collector is also connected to the base of the second transistor, means for applying a second different variable potential between the base and emitter of the third transistor to also provide a different variable amplified current flow across the emitter-collector of the second transistor, and coil means to which said two different variable amplified current flows from the second transistor are connected whereby said two different variable amplified current flows may be utilized as a control.

References Cited in the file of this patent

UNITED STATES PATENTS

| | | |
|---|---|---|
| 2,511,219 | Pogorzelski | June 13, 1950 |
| 2,714,188 | Scherer | June 26, 1955 |
| 2,751,545 | Chase | June 19, 1956 |
| 2,759,142 | Hamilton | Aug. 14, 1956 |
| 2,801,297 | Becking et al. | July 30, 1957 |
| 2,801,298 | Mital | July 30, 1957 |
| 2,801,383 | Comins et al. | July 30, 1957 |
| 2,809,301 | Short | Oct. 8, 1957 |